(12) United States Patent
Isobe

(10) Patent No.: US 7,900,222 B2
(45) Date of Patent: Mar. 1, 2011

(54) OPTICAL PICKUP AND DISK DRIVE APPARATUS

(75) Inventor: Hiroshi Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 281 days.

(21) Appl. No.: 12/185,336

(22) Filed: Aug. 4, 2008

(65) Prior Publication Data

US 2009/0073854 A1    Mar. 19, 2009

(30) Foreign Application Priority Data

Sep. 14, 2007    (JP) ............................. 2007-239360

(51) Int. Cl.
   *G11B 7/09*    (2006.01)
(52) U.S. Cl. .................. 720/684; 720/687; 369/44.16
(58) Field of Classification Search .................. 720/682, 720/684, 687–688; 369/44.15–44.16
   See application file for complete search history.

(56) References Cited

U.S. PATENT DOCUMENTS 6,480,460 B1 * 11/2002 Ohkuma et al. ............. 369/246

2006/0077781 A1 * 4/2006 Yamada .................... 369/44.14

FOREIGN PATENT DOCUMENTS

JP    2006-066016    3/2006

\* cited by examiner

*Primary Examiner*—Aristotelis Psitos
(74) *Attorney, Agent, or Firm*—Oblon, Spivak, McClelland, Maier & Neustadt, L.L.P.

(57) ABSTRACT

An optical pickup has an objective lens drive device which includes a fixed block fixed to a movement base, a movable block having an objective lens and a lens holder that holds the objective lens, a plurality of support springs that couples the fixed block with the movable block, and a focusing magnetic coil that operates the movable block in a focusing direction. A distance between the fixed block and a recording surface of a disk recording medium is larger than a distance between the movable block and the recording surface. The support springs are inclined with respect to the recording surface. The support springs have a longitudinal direction orthogonal to a direction of a thrust generated at the focusing magnetic circuit to the movable block during a focusing operation.

6 Claims, 4 Drawing Sheets

OPTICAL PICKUP AND DISK DRIVE APPARATUS

CROSS REFERENCES TO RELATED APPLICATIONS

The present invention contains subject matter related to Japanese Patent Application JP 2007-239360 filed in the Japanese Patent Office on Sep. 14, 2007, the entire contents of which are incorporated herein by reference.

BACKGROUND OF THE INVENTION

1. Field of the Invention

The present invention relates to an optical pickup and a disk drive apparatus. In particular, the present invention relates to a technical field that provides a good servo characteristic while the degree of freedom for arrangement is assured, by setting a longitudinal direction of a support spring for coupling a fixed block with a movable block, to a predetermined direction.

2. Description of the Related Art

A disk drive apparatus is provided which records or reproduces information signals on or from a disk recording medium, such as an optical disk or a magneto-optical disk. Such a disk drive apparatus includes an optical pickup that is moved in a radial direction of the disk recording medium, and irradiates the disk recording medium with laser light.

The optical pickup includes a movement base that is moved in the radial direction of the disk recording medium, and an objective lens drive device arranged in an arrangement recess formed in the movement base. The objective lens drive device includes a fixed block, and a movable block supported by the fixed block via a support spring such as a metal wire.

In the optical pickup, the movable block having an objective lens is operated relative to the fixed block in a focusing direction, which is a direction toward and away from a recording surface of the disk recording medium, to perform focusing adjustment, and the movable block is operated relative to the fixed block in a tracking direction, which is a substantially radial direction of the disk recording medium, to perform tracking adjustment, so that a spot with laser light for irradiation of the disk recording medium is focused onto a recording track of the disk recording medium.

With such an optical pickup, it is desirable to close a portion of the objective lens drive device other than the movable block, with a cover so as to prevent, for example, the support spring from being deformed when an impact is applied. Unfortunately, it is sometimes difficult to obtain a space sufficient for arrangement of the cover due to arrangement of other components. In particular, the optical pickup is desired to be reduced in height, and hence, a distance between the disk recording medium and the objective lens drive device has to be reduced. Thus, it is difficult to obtain a space for the arrangement of the cover.

In light of the situations, an optical pickup of a related art is provided, in which the fixed block is arranged at a position farther from the disk recording medium than the movable block is, and the support spring for coupling the fixed block with the movable block is inclined with respect to the disk recording medium, to obtain the space for the arrangement of the cover (for example, see Japanese Unexamined Patent Application Publication No. 2006-66016).

SUMMARY OF THE INVENTION

In an optical pickup disclosed in the above-directed publication, referring to FIG. 4, an objective lens drive device a is configured such that a direction of a thrust P generated at a focusing magnetic circuit c to a movable block b during a focusing operation is orthogonal to a recording surface of a disk recording medium d, and a longitudinal direction of support springs f for coupling a fixed block e with the movable block b is inclined with respect to a direction orthogonal to the direction of the thrust P (tangential direction).

Hence, during the focusing operation, a force Pa may be generated in the longitudinal direction of the support springs f, as a component of the thrust P. The force Pa is a force in an expansion and contraction direction of the support springs f, the force which is unnecessary for the focusing operation. The force Pa may cause an unnecessary vibration mode in the expansion and contraction direction to be excited during the focusing operation, and may defectively affect the focusing operation.

Accordingly, it is desirable to provide an optical pickup and a disk drive apparatus capable of providing a good servo characteristic while the degree of freedom for arrangement is assured.

An optical pickup according to an embodiment of the present invention includes a movement base that is moved in a radial direction of a disk recording medium that is placed on a disk table; and an objective lens drive device arranged at the movement base. The optical pickup irradiates the disk recording medium placed on the disk table with laser light. In the optical pickup, the objective lens drive device includes a fixed block fixed to the movement base, a movable block having an objective lens and a lens holder that holds the objective lens, and being configured to be operated relative to the fixed block in a focusing direction, which is a direction toward and away from a recording surface of the disk recording medium, and in a tracking direction, which is a substantially radial direction of the disk recording medium, a plurality of support springs that couple the fixed block with the movable block, and a focusing magnetic circuit having a focusing coil and a focusing magnet, and being configured to operate the movable block in the focusing direction. A distance between the fixed block and the recording surface of the disk recording medium is larger than a distance between the movable block and the recording surface of the disk recording medium. The plurality of support springs are inclined with respect to the recording surface of the disk recording medium. Also, the plurality of support springs have a longitudinal direction orthogonal to a direction of a thrust generated at the focusing magnetic circuit to the movable block during a focusing operation.

A disk drive apparatus according to another embodiment of the present invention includes a disk table on which a disk recording medium is placed; and an optical pickup that irradiates the disk recording medium placed on the disk table with laser light through an objective lens. In the disk drive apparatus, the optical pickup includes a movement base that is moved in a radial direction of the disk recording medium placed on the disk table, and an objective lens drive device arranged at the movement base. In the optical pickup, the objective lens drive device includes a fixed block fixed to the movement base, a movable block having the objective lens and a lens holder that holds the objective lens, and being configured to be operated relative to the fixed block in a focusing direction, which is a direction toward and away from a recording surface of the disk recording medium, and in a tracking direction, which is a substantially radial direction of the disk recording medium, a plurality of support springs that couple the fixed block with the movable block, and a focusing magnetic circuit having a focusing coil and a focusing magnet, and being configured to operate the movable block in the focusing direction. A distance between the fixed block and the recording surface of the disk recording medium is larger than a distance between the movable block and the recording surface of the disk recording medium. The plurality of support springs are inclined with respect to the recording surface of the disk recording medium. Also, the plurality of support springs have a longitudinal direction orthogonal to a direction of a thrust generated at the focusing magnetic circuit to the movable block during a focusing operation.

Accordingly, the component of the thrust generated at the focusing magnetic circuit to the movable block is not generated in the longitudinal direction of the support springs. The unnecessary vibration mode in the expansion and contraction direction of the support springs is not excited. Hence, the good servo characteristic can be provided while the degree of freedom for the arrangement of the fixed block is assured.

In addition, a surface of the lens holder of the movable block facing the recording surface of the disk recording medium may be parallel to the recording surface, and a surface of the fixed block facing the recording surface of the disk recording medium may be parallel to the recording surface. Accordingly, the space for the arrangement of the objective lens drive device can be minimized, thereby promoting reduction in size of the optical pickup.

DESCRIPTION OF THE PREFERRED EMBODIMENTS

Hereinafter, an optical pickup and a disk drive apparatus according to embodiments of the present invention are described with reference to the accompanying drawings.

Figure 1:
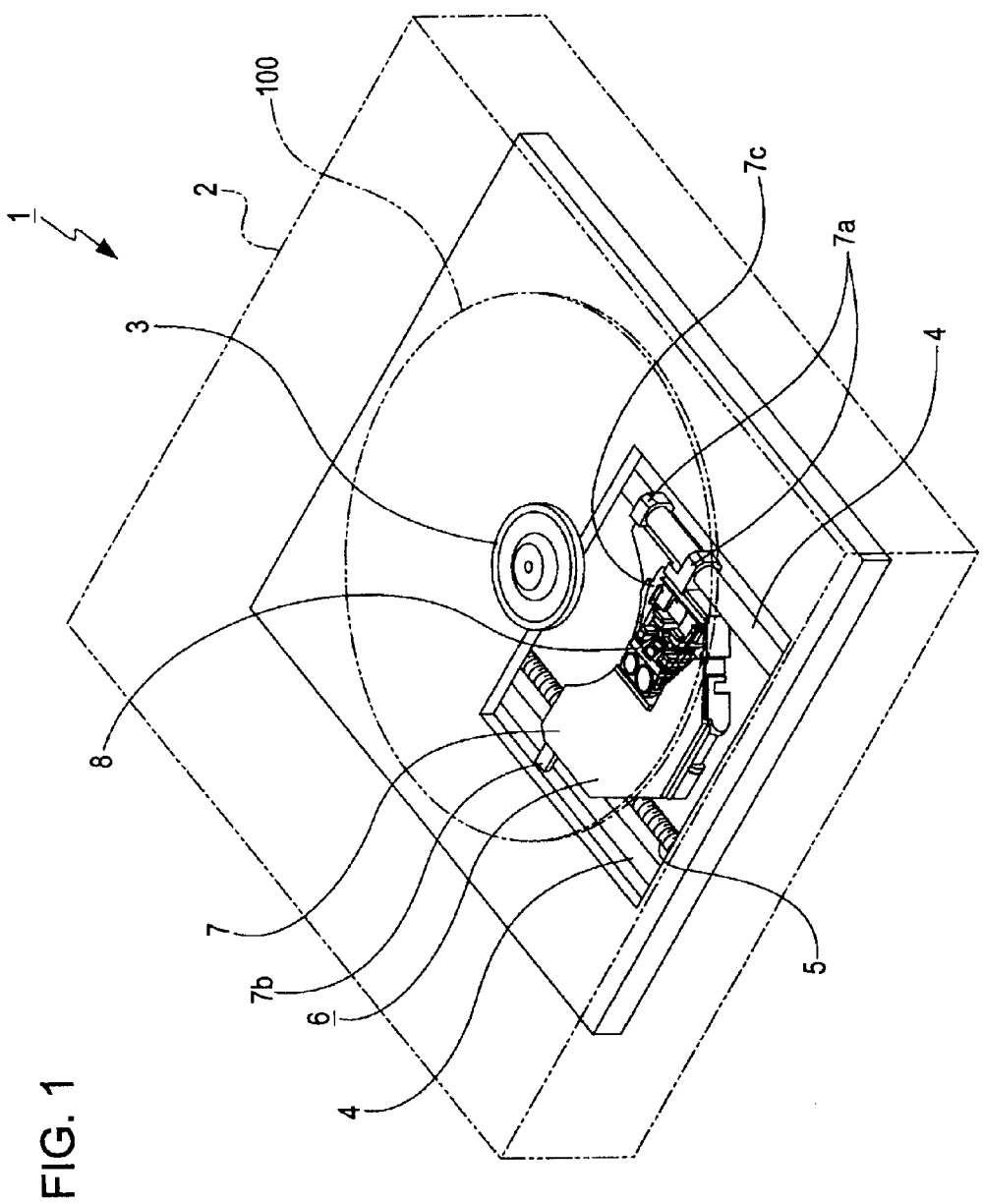
FIG. 1 is a schematic perspective view showing, together with FIGS. 2 and 3, an optical pickup and a disk drive apparatus according to embodiments of the present invention.

A disk drive apparatus 1 has necessary members and mechanisms arranged in an outer case 2 (see FIG. 1). The outer case 2 has a disk insertion slot (not shown).

A chassis (not shown) is arranged in the outer case 2. A disk table 3 is fixed to a motor shaft of a spindle motor which is mounted at the chassis.

The chassis supports a lead screw 5 to which parallel guide shafts 4 are mounted and which is rotated by a feed motor (not shown).

An optical pickup 6 includes a movement base 7, necessary optical components provided at the movement base 7, and an objective lens drive device 8 arranged on the movement base 7. Bearing portions 7a and 7b provided at both end portions of the movement base 7 are supported slidably by the guide shafts 4.

When a nut member (not shown) provided at the movement base 7 is screwed to the lead screw 5, and the lead screw 5 is rotated by the feed motor, the nut member is fed in a direction corresponding to a rotation direction of the lead screw 5, and thus, the optical pickup 6 is moved in a radial direction of a disk recording medium 100 which is placed on the disk table 3.

The objective lens drive device 8 includes a fixed block 9 and a movable block 10 which is operated relative to the fixed block 9. The objective lens drive device 8 is arranged in an arrangement recess 7c which is formed in the movement base 7 (see FIGS. 1 and 2).

The fixed block 9 and the movable block 10 are arranged apart in a tangential direction of a recording track of the disk recording medium 100.

Figure 2:
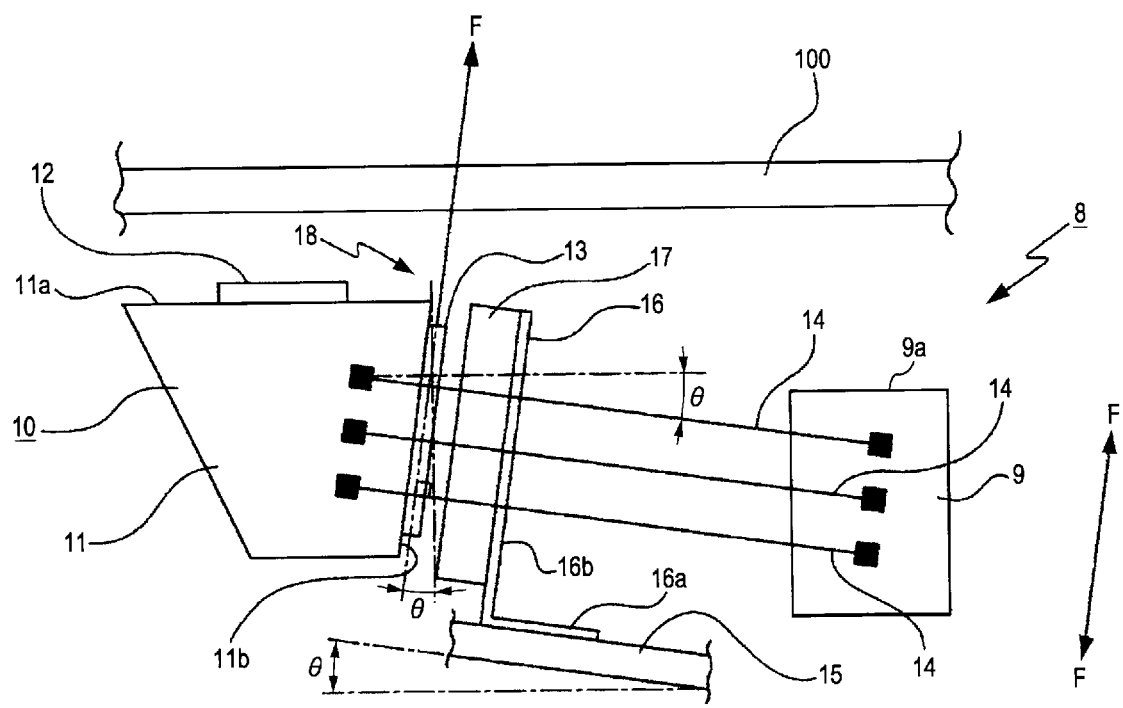
FIG. 2 is a schematic side view showing an objective lens drive device.

The fixed block 9 is fixed to the movement base 7. Referring to FIG. 2, the fixed block 9 is arranged at a position farther from a recording surface of the disk recording medium 100 than the movable block 10 is. The fixed block 9 has an upper surface 9a which is located below an upper surface of the movable block 10. The upper surface 9a of the fixed block 9 is parallel to the recording surface of the disk recording medium 100.

The movable block 10 is configured such that necessary components thereof are mounted at a lens holder 11. The lens holder 11 has an upper surface 11a on which objective lenses 12 are mounted. The lens holder 11 is arranged such that the upper surface 11a is parallel to the recording surface of the disk recording medium 100, and a rear surface 11b thereof is at an acute angle to the upper surface 11a by an angle θ with respect to 90°.

On the rear surface 11b of the lens holder 11, a focusing coil 13, a tracking coil (not shown), and a tilting coil (not shown) are mounted.

The movable block 10 is coupled with the fixed block 9 by, for example, three pairs of support springs 14, and is retained in the air by the support springs 14. The support springs 14 are arranged such that a direction in which the fixed block 9 and the movable block 10 are coupled with each other, or a longitudinal direction of the support springs 14, is inclined with respect to a horizontal direction by an angle θ in an ascending manner toward the front.

The support springs 14 are made of a conductive metal material and formed into, for example, wire-like shapes. In the objective lens drive device 8, the focusing coil 13, the tracking coil, and the tilting coil are supplied with driving current from a power supply circuit (not shown) through the support springs 14.

A base plate 15 is arranged in the arrangement recess 7c of the movement base 7. The base plate 15 is arranged to be inclined with respect to the horizontal direction by the angle θ in an ascending manner toward the front.

A yoke member 16 made of a magnetic metal material is mounted at the base plate 15. The yoke member 16 includes a base portion 16a mounted on the base plate 15, and a plurality of yoke portions 16b arranged orthogonal to the base portion 16a (FIG. 2 showing only a single yoke portion 16b).

Magnets 17 are respectively mounted on front surfaces of the yoke portions 16b. The yoke portions 16b and the magnets 17 are parallel to the focusing coil 13, the tracking coil, and the tilting coil. The magnets 17 are located to respectively face the focusing coil 13, the tracking coil, and the tilting coil.

The focusing coil 13, the magnet 17 located to face the focusing coil 13, and the yoke portion 16b with that magnet 17 mounted define a focusing magnetic circuit 18. The tracking coil, the magnet 17 located to face the tracking coil, and the yoke portion 16b with that magnet 17 mounted define a tracking magnetic circuit. The tilting coil, the magnet 17 located to face the tilting coil, and the yoke portion 16b with that magnet 17 mounted define a tilting magnetic circuit.

As described above, since the support springs 14 have the longitudinal direction inclined with respect to the horizontal direction by the angle θ, the focusing coil 13, the magnet 17, and the yoke portion 16b which define the focusing magnetic circuit 18 are inclined with respect to a vertical direction by the angle θ. Accordingly, the longitudinal direction of the support springs 14 is orthogonal to a direction of a thrust (direction F in FIG. 2) generated at the focusing magnetic circuit 18 to the movable block 10 during a focusing operation, and is orthogonal to a direction of a thrust (left-right direction in FIG. 2) generated at the tracking magnetic circuit to the movable block 10 during a tracking operation.

When the focusing coil 13, the tracking coil, or the tilting coil is supplied with driving current from the power supply circuit (not shown), a force corresponding to a direction of the driving current and to a direction of magnetic flux generated by the magnet 17 is generated. Hence, the movable block 10 is operated in a focusing direction, a tracking direction, or a tilting direction.

The focusing direction is a direction toward and away from the disk recording medium 100 (direction F in FIG. 2), which is a direction inclined with respect to an up-down direction by the angle θ. The tracking direction is the radial direction of the disk recording medium 100. The tilting direction is a direction around an axis extending in a direction orthogonal to the tracking direction.

When the movable block 10 is operated in the focusing direction, the tracking direction, or the tilting direction, the support springs 14 are elastically deformed.

In the disk drive apparatus 1 configured as described above, when the disk table 3 is rotated by the rotation of the spindle motor, the disk recording medium 100 placed on the disk table 3 is rotated, and simultaneously, the optical pickup 6 is moved in the radial direction of the disk recording medium 100, so as to perform a recording operation or a reproducing operation for the disk recording medium 100.

In the recording operation and the reproducing operation, when the focusing coil 13 is supplied with the driving current, as described above, the movable block 10 of the objective lens drive device 8 is operated in the focusing direction F-F in FIG. 2 relative to the fixed block 9, so that focusing adjustment is performed to focus a spot with laser light for irradiation through the objective lenses 12, onto the recording surface of the disk recording medium 100.

Also, when the tracking coil is supplied with the driving current, as described above, the movable block 10 of the objective lens drive device 8 is operated in the tracking direction relative to the fixed block 9, so that tracking adjustment is performed to focus a spot with laser light for irradiation through the objective lenses 12, onto the recording track of the disk recording medium 100.

Further, when the tilting coil is supplied with the driving current, as described above, the movable block 10 of the objective lens drive device 8 is operated in the tilting direction relative to the fixed block 9, so that tilting adjustment is performed to cause an optical axis of laser light for irradiation through the objective lenses 12 to become perpendicular to the recording surface of the disk recording medium 100.

In the optical pickup 6, as described above, the fixed block 9 is at the position farther from the recording surface of the disk recording medium 100 than the movable block 10 is, and the support springs 14 are inclined with respect to the recording surface of the disk recording medium 100. Also, the optical pickup 6 is configured such that the focusing direction F, and the longitudinal direction of the support springs 14 are orthogonal to each other. Thus, although the fixed block 9 is arranged at the position farther from the recording surface of the disk recording medium 100 than the movable block 10 is, resulting in the support springs 14 being inclined, a thrust generated at the focusing magnetic circuit 18 to the movable block 10 does not cause a component of the thrust to be generated in the longitudinal direction of the support springs 14. An unnecessary vibration mode is not excited in an expansion and contraction direction of the support springs 14. Accordingly, a good servo characteristic can be provided while the degree of freedom is secured in view of arrangement of the fixed block 9.

As described above, since the fixed block 9 is arranged at a position lower than the position of the movable block 10, a portion of the objective lens drive device 8 other than the movable block 10 can be closed with a cover from the above. Thus, for example, the support springs 14 can be prevented from being deformed when an impact is applied.

In the optical pickup 6, since the focusing direction F is orthogonal to the longitudinal direction of the support springs 14, the thrust generated at the focusing magnetic circuit 18 to the movable block 10 does not cause the component of the thrust to be generated in the longitudinal direction of the support springs 14 regardless of the value of the angle θ. Hence, the angle θ can be desirably determined.

Also, in the optical pickup 6, since the upper surface 11a of the lens holder 11 of the movable block 10 is parallel to the recording surface of the disk recording medium 100, and the upper surface 9a of the fixed block 9 is parallel to the recording surface of the disk recording medium 100, a space below the disk recording medium 100 for arrangement of the objective lens drive device 8 can be minimized, thereby promoting reduction in size of the optical pickup 6.

Further, since the upper surface 11a of the lens holder 11 of the movable block 10 is parallel to the recording surface of the disk recording medium 100, the optical axis of the laser light for irradiation on the recording surface of the disk recording medium 100 through the objective lenses 12 becomes orthogonal to the recording surface of the disk recording medium 100 at a neutral position of the optical axis before the optical axis is operated in the focusing direction. Hence, adjustment for the optical axis of the laser light can be facilitated.

The objective lens drive device 8 is assembled with the movement base 7, for example, by the following procedure.

Figure 3:
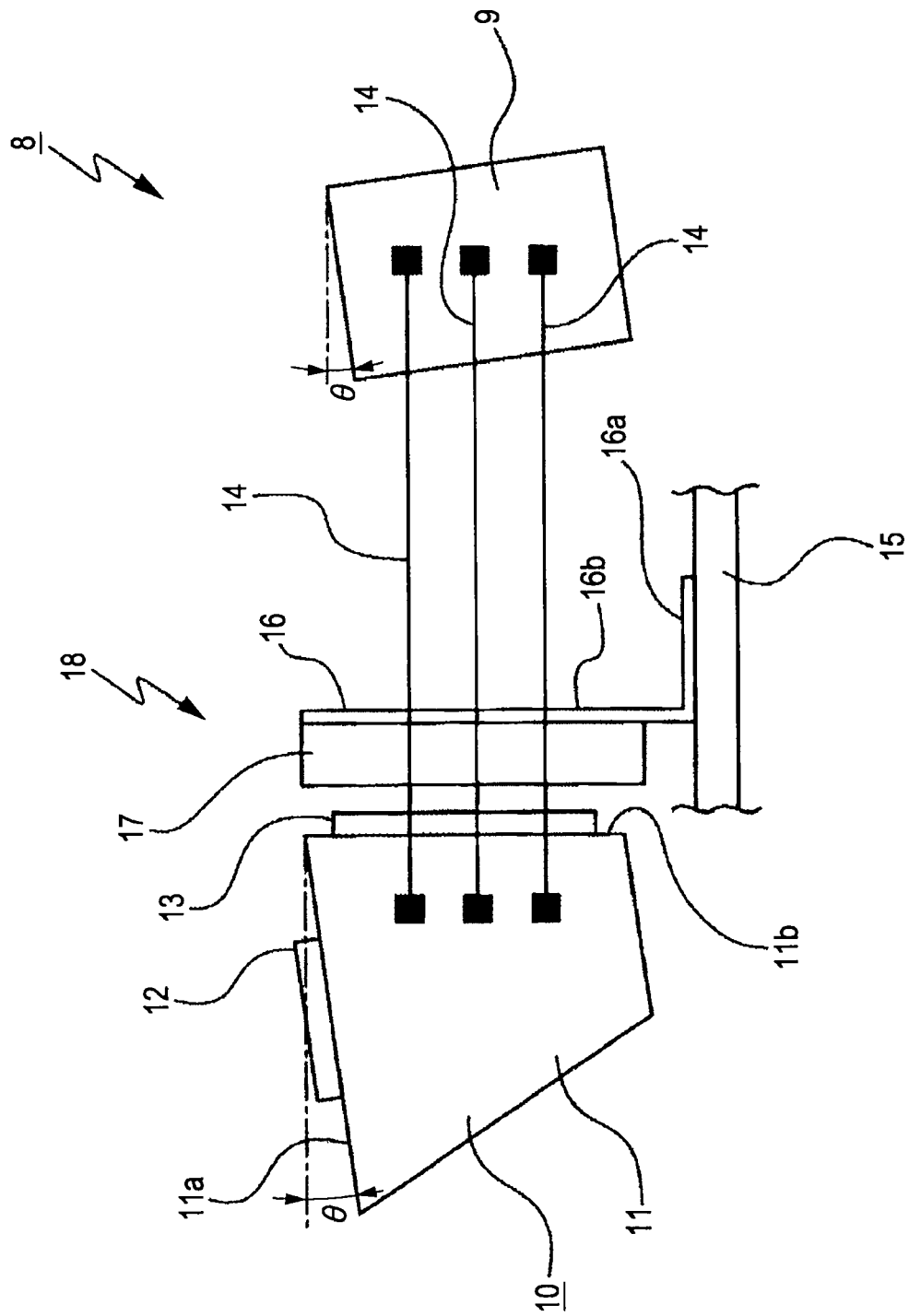
FIG. 3 is a schematic side view showing the objective lens drive device before the objective lens drive device is inclined.
Figure 4:
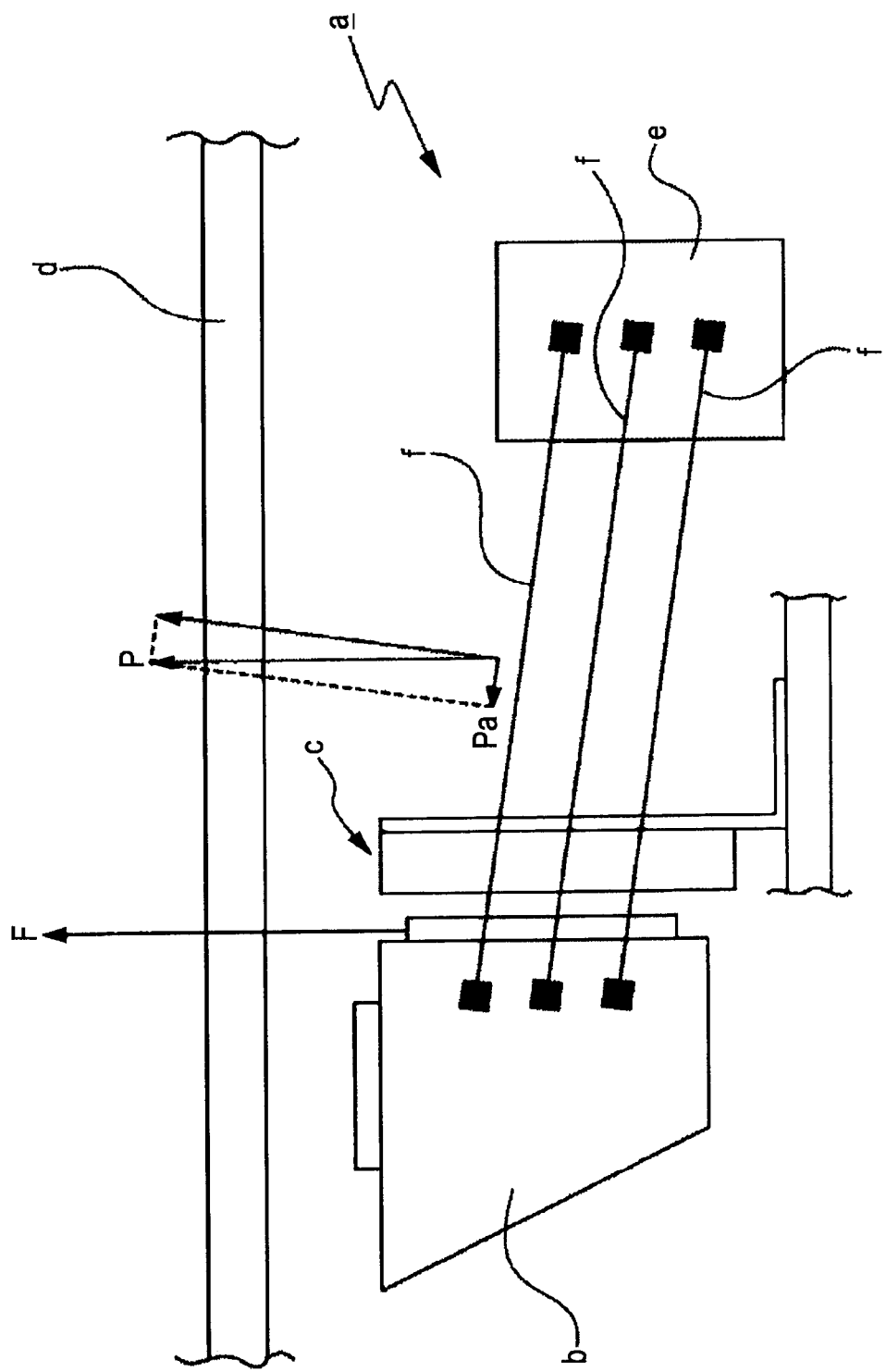
FIG. 4 is a schematic side view showing an objective lens drive device of a related art.

First, the base plate 15 with the objective lens drive device 8 mounted is horizontally arranged in the arrangement recess 7c of the movement base 7 (see FIG. 3). At this time, the upper surface 11a of the lens holder 11 of the movable block 10 and the upper surface 9a of the fixed block 9 are inclined with respect to the horizontal surface by the angle θ in a descending manner toward the front. Accordingly, the longitudinal direction of the support springs 14 is aligned with the horizontal direction.

Then, the base plate 15 with the objective lens drive device 8 mounted is inclined by the angle θ in an ascending manner toward the front. By inclining the base plate 15 by the angle θ, the upper surface 11a of the lens holder 11 and the upper surface 9a of the fixed block 9 become horizontal, and the support springs 14 are inclined with respect to the horizontal direction by the angle θ.

While the focusing direction is the up-down direction, the tracking direction is the left-right direction, and the tangential direction is the front-rear direction in the above description, these directions are given as examples and not limited thereto.

The specific shapes and structures described in the embodiment for implementing the present invention are merely examples to implement the present invention, and it is noted that the technical scope of the present invention should not be interpreted in a limited way by these examples.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
   a movement base that is moved in a radial direction of a disk recording medium that is placed on a disk table; and
   an objective lens drive device arranged at the movement base,
   wherein the optical pickup irradiates the disk recording medium placed on the disk table with laser light, and
   wherein the objective lens drive device includes
      a fixed block fixed to the movement base,
      a movable block having an objective lens and a lens holder that holds the objective lens, and being configured to be operated relative to the fixed block in a focusing direction, which is a direction toward and away from a recording surface of the disk recording medium, and in a tracking direction, which is a substantially radial direction of the disk recording medium,
      a plurality of support springs that couple the fixed block with the movable block, and
      a focusing magnetic circuit having a focusing coil and a focusing magnet, and being configured to operate the movable block in the focusing direction, wherein
      a distance between the fixed block and the recording surface of the disk recording medium is larger than a distance between the movable block and the recording surface of the disk recording medium,
      the plurality of support springs are inclined with respect to the recording surface of the disk recording medium, and
      the plurality of support springs have a longitudinal direction orthogonal to a direction of a thrust generated at the focusing magnetic circuit to the movable block during a focusing operation.

2. The optical pickup according to claim 1,
   wherein a surface of the lens holder of the movable block facing the recording surface of the disk recording medium is parallel to the recording surface, and
   wherein a surface of the fixed block facing the recording surface of the disk recording medium is parallel to the recording surface.

3. The optical pickup according to claim 1, wherein a surface of the lens holder of the movable block facing the recording surface of the disk recording medium defines an upper surface parallel to the recording surface, and a surface of the lens holder to which the focusing coil is mounted defines a rear surface, the rear surface being at an acute angle to the upper surface by an angle θ with respect to 90°.

4. A disk drive apparatus comprising:
   a disk table on which a disk recording medium is placed; and
   an optical pickup that irradiates the disk recording medium placed on the disk table with laser light through an objective lens,
   wherein the optical pickup includes
      a movement base that is moved in a radial direction of the disk recording medium placed on the disk table, and
      an objective lens drive device arranged at the movement base, wherein
      the objective lens drive device includes
         a fixed block fixed to the movement base,
         a movable block having the objective lens and a lens holder that holds the objective lens, and being configured to be operated relative to the fixed block in a focusing direction, which is a direction toward and away from a recording surface of the disk recording medium, and in a tracking direction, which is a substantially radial direction of the disk recording medium,
         a plurality of support springs that couple the fixed block with the movable block, and
         a focusing magnetic circuit having a focusing coil and a focusing magnet, and being configured to operate the movable block in the focusing direction, wherein
         a distance between the fixed block and the recording surface of the disk recording medium is larger than a distance between the movable block and the recording surface of the disk recording medium,
         the plurality of support springs are inclined with respect to the recording surface of the disk recording medium, and
         the plurality of support springs have a longitudinal direction orthogonal to a direction of a thrust generated at the focusing magnetic circuit to the movable block during a focusing operation.

5. The optical pickup according to claim 1, wherein the plurality of support springs are parallel to each other and have the longitudinal direction orthogonal to the direction of the thrust when at a rest position.

6. The optical pickup according to claim 3, wherein the objective lens drive device further includes a base portion which is inclined with respect to the recording surface of the disk recording medium and a yoke arranged perpendicular to the base portion, the yoke supporting the focusing magnet and being parallel to the rear surface and the direction of the thrust generated at the focusing magnetic circuit to the movable block during the focusing operation.

* * * * *